United States Patent
Lee et al.

(10) Patent No.: US 12,346,606 B2
(45) Date of Patent: Jul. 1, 2025

(54) DATA STORAGE DEVICE AND READ OPERATION CONTROL METHOD THEREOF

(71) Applicant: SK hynix Inc., Icheon-si (KR)

(72) Inventors: Han Bin Lee, Icheon-si (KR); So Jin Jeong, Icheon-si (KR); Won Sun Park, Icheon-si (KR); Jae Young Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 4 days.

(21) Appl. No.: 18/460,229

(22) Filed: Sep. 1, 2023

(65) Prior Publication Data

US 2024/0385776 A1    Nov. 21, 2024

(30) Foreign Application Priority Data

May 19, 2023 (KR) .................... 10-2023-0065017

(51) Int. Cl.
*G06F 3/06* (2006.01)

(52) U.S. Cl.
CPC .......... *G06F 3/0659* (2013.01); *G06F 3/0658* (2013.01); *G06F 3/0604* (2013.01); *G06F 3/0679* (2013.01)

(58) Field of Classification Search
CPC .... G06F 3/0659; G06F 3/0658; G06F 3/0604; G06F 3/0679
See application file for complete search history.

(56) References Cited

U.S. PATENT DOCUMENTS

| | | | |
|---|---|---|---|
| 9,116,620 B2 | 8/2015 | Lassa et al. | |
| 9,152,553 B1 | 10/2015 | Shin et al. | |
| 2016/0124873 A1* | 5/2016 | Xu | G06F 3/061 711/167 |
| 2016/0179388 A1 | 6/2016 | Huang et al. | |
| 2016/0371015 A1* | 12/2016 | Gay | G06F 13/1689 |
| 2021/0064532 A1* | 3/2021 | Park | G06F 12/0851 |
| 2021/0311825 A1* | 10/2021 | Park | G06F 12/0871 |
| 2024/0203507 A1* | 6/2024 | Eliash | G11C 16/08 |

OTHER PUBLICATIONS

NAND Flash Memory MT29F4G08ABADAH4, MT29F4G08ABADAWP, MT29F4G08ABBDAH4, MT29F4G08ABBDAHC, MT29F4G16ABADAH4, T29F4G16ABADAWP, MT29F4G16ABBDAH4, MT29F4G16ABBDAHC, MT29F8G08ADADAH4, MT29F8G08ADBDAH4, MT29F8G16ADADAH4, MT29F8G16ADBDAH4, MT29F16G08AJADAWP, 4Gb, 8Gb, 16Gb: x8, x16 NAND Flash Memory Features, 2009 Micron Technology, Inc.

* cited by examiner

*Primary Examiner* — Gurtej Bansal
(74) *Attorney, Agent, or Firm* — WILLIAM PARK & ASSOCIATES LTD.

(57) ABSTRACT

A data storage device may include a memory device divided into a plurality of logical units, and a controller configured to generate a first read command sequence and a second read command sequence for a first logical unit and a second logical unit, respectively, among the plurality of logical units, in response to an external command and configured to continuously output the first and second read command sequences to the memory device.

15 Claims, 4 Drawing Sheets

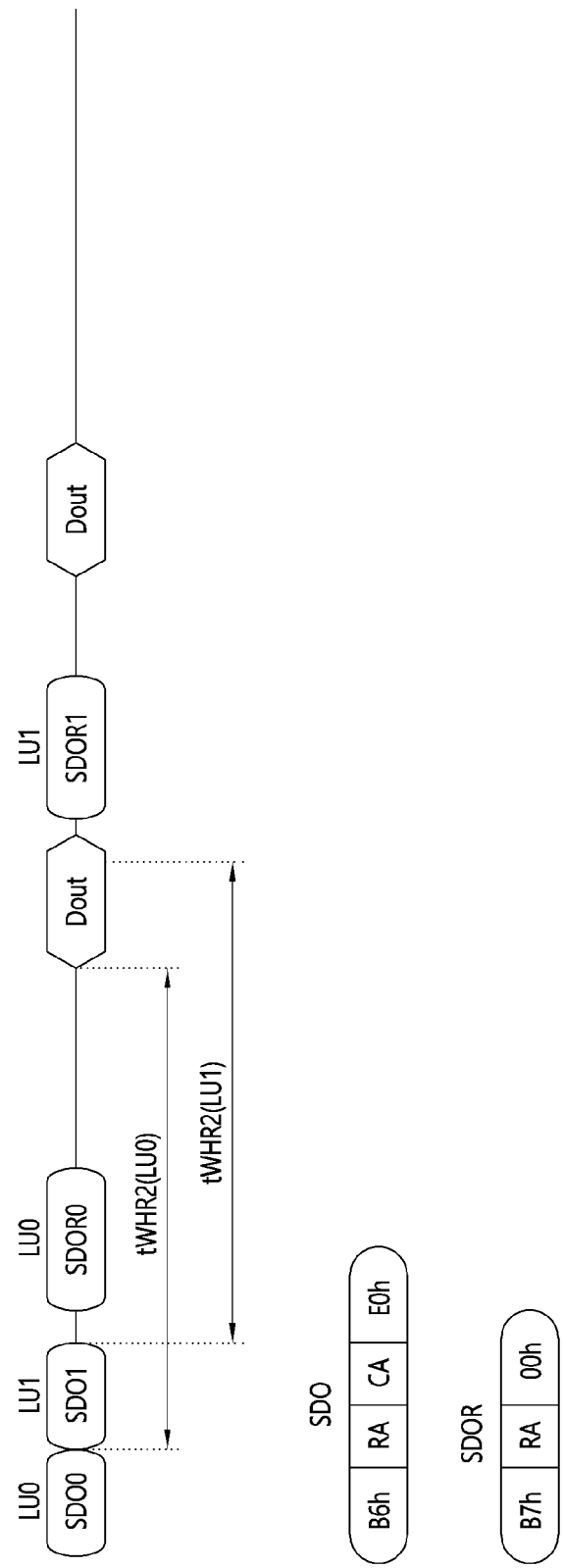

DATA STORAGE DEVICE AND READ OPERATION CONTROL METHOD THEREOF

CROSS-REFERENCES TO RELATED APPLICATION

The present application claims priority under 35 U.S.C. § 119(a) to Korean application number 10-2023-0065017, filed on May 19, 2023, in the Korean Intellectual Property Office, which is incorporated herein by reference in its entirety.

BACKGROUND

1. Technical Field

The present technology relates to a semiconductor circuit, and more particularly, to a data storage device and an operating method thereof.

2. Related Art

A data storage device is connected to a host and performs data input/output operations according to a request of the host. The data storage device may use various storage media to store data. The data storage device may include a memory device such as a solid state drive (SSD) or a memory card, for example, a device that stores data in a non-volatile memory. A storage medium using a non-volatile memory has advantages, such as large capacity, non-volatility, low cost, low power consumption, and high data processing speed.

FIG. 1 is a diagram illustrating a data output method of a data storage device according to a prior art.

Referring to FIG. 1, a data storage operation of the data storage device, according to the prior art, is managed in units of unit areas, for example, logical units (LUs). The data storage device allows data DOUT to be output by selecting a logical unit (LU0) according to a random data output command RDout requested from a host. Because a column randomly changes, a new random data output command RDout needs to be applied to select another logic unit (LU1) after the random data output command RDout is input and a timing parameter tWHR2, which is determined based on an operation standard of NAND flash memory, elapses. Therefore, the data storage device, according to the prior art, has a problem in that operational performance thereof deteriorates due to an increase in command overhead caused by the timing parameter tWHR2.

SUMMARY

A data storage device according to an embodiment of the present technology may include: a memory device divided into a plurality of logical units; and a controller configured to generate a first read command sequence and a second read command sequence for a first logical unit and a second logical unit, respectively, among the plurality of logical units, in response to an external command and configured to continuously output the first and second read command sequences to the memory device.

A data storage device according to an embodiment of the present technology may include: a memory device including a plurality of logical units, each including a plurality of planes, wherein each of the plurality of planes includes a plurality of sectors; and a controller configured to generate a first sector read command sequence for one of a plurality of sectors of a first logical unit and a second sector read command sequence for one of a plurality of sectors of a second logical unit, among the plurality of logical units, in response to an external command and configured to continuously output the first and second sector read command sequences to the memory device.

An operating method of a data storage device including a memory device including a plurality of logical units, each including a plurality of planes, each of the plurality of planes including a plurality of sectors, and a controller connected to the memory device, according to an embodiment of the present technology, the operating method may include: generating, by the controller, a first read command sequence for a first logical unit and a second read command sequence for a second logical unit, among the plurality of logical units, in response to an external read command received from a host; and outputting, by the controller, the first read command sequence to the memory device and continuously outputting, by the controller, the second read command sequence to the memory device within a period of time determined by a timing parameter according to the first read command sequence.

BRIEF DESCRIPTION OF THE DRAWINGS

FIG. 5 is a diagram illustrating an operating method of a data storage device, according to an embodiment of the present technology.

DETAILED DESCRIPTION

Various embodiments of the present technology are directed to a data storage device capable of reducing command overhead, and an operating method of the data storage device.

Hereinafter, embodiments of the present technology will be described in more detail with reference to the accompanying drawings.

Figure 1:
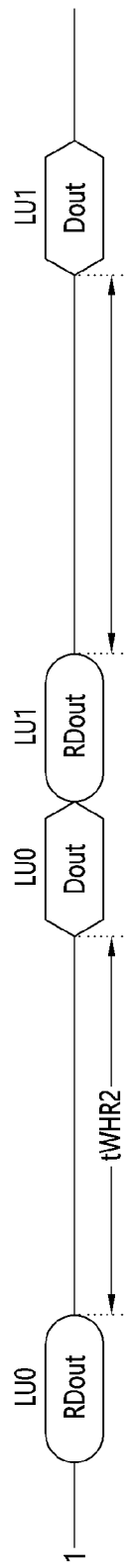
FIG. 1 is a diagram illustrating a data output method of a data storage device according to a prior art.
Figure 2:
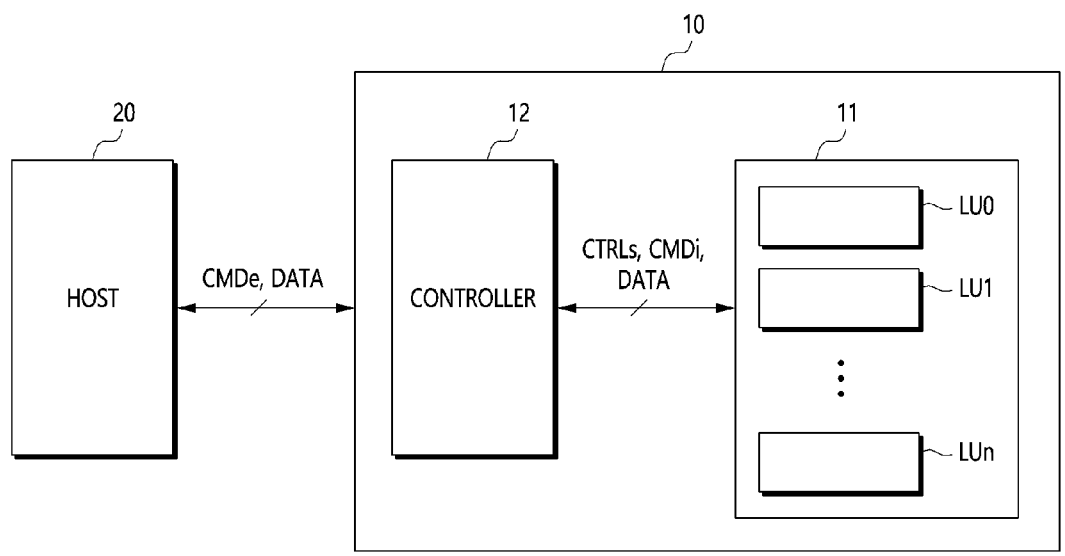
FIG. 2 is a diagram illustrating a configuration of a data storage device, according to an embodiment of the present technology.

FIG. 2 is a diagram illustrating a configuration of a data storage device 10, according to an embodiment of the present technology.

Referring to FIG. 2, the data storage device 10, according to of the present embodiment, may be connected to a host 20. The data storage device 10 may transmit and receive data DATA to and from the host 10 according to a command CMDe (hereinafter referred to as an external command) provided by the host 20. The data storage device 10 may include a memory device 11 and a controller 12.

The memory device 11 may include a plurality of logical units LU0 to LUn. The logical unit LU may be a unit for managing a memory area of the data storage device 10. Each of the plurality of logical units LU0 to LUn may include one or more memory dies.

The controller 12 may generate a plurality of control signals CRTLs and command sequences CMDi in response to the external command CMDe and may output the plurality of control signals CRTLs and the command sequences CMDi to the memory device 11. The controller 12 may transmit and receive the data DATA to and from the memory device 11 according to read and write operations. The plurality of control signals CRTLs may include a clock signal, a chip enable signal, a write enable bar signal, and a read enable signal.

The controller 12 may generate a first read command sequence and a second read command sequence for a first logical unit and a second logical unit, respectively, among the plurality of logical units LU0 to Lun, in response to the external command CMDe and may continuously output the first and second read command sequences to the memory device 11.

The controller 12 may output the second read command sequence to the memory device 11 within a period of time determined by a timing parameter tWHR2 according to the first read command sequence. The timing parameter tWHR2, which is one of the timing parameters determined based on an operation standard of NAND flash memory, may be defined in the following manner: /WE high to RE low for random data out. "/WE" may be a write enable bar signal, and "RE" may be a read enable signal.

The controller 12 may generate a first address recovery sequence for recovering a row address included in the first read command sequence and may output the first address recovery sequence to the memory device 11 after outputting the second read command sequence. The controller 12 may output the second read command sequence and the first address recovery sequence to the memory device 11 within the period of time determined by the timing parameter tWHR2.

The controller 12 may generate a second address recovery sequence for recovering a row address included in the second read command sequence and may output the second address recovery sequence to the memory device 11 after outputting data output according to the first read command sequence.

The controller 12 may allow row addresses and column addresses to be included in the first read command sequence and the second read command sequence and may output the row addresses the memory device 11 at an earlier timing compared to the column addresses.

Figure 3:
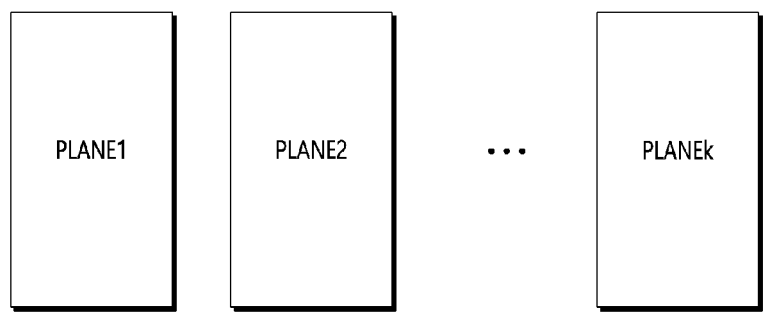
FIG. 3 is a diagram illustrating a configuration of a logical unit illustrated in FIG. 2.

FIG. 3 is a diagram illustrating a configuration of the logical unit LU0 illustrated in FIG. 2.

As described above, the logical unit LU0 may include one or more memory dies, that is, a plurality of memory dies, and FIG. 3 illustrates an example in which the logical unit LU0 includes one memory die.

Referring to FIG. 3, the logical unit LU0 may include a plurality of planes PLANE 1 to PLANE k. Each of the plurality of planes PLANE 1 to PLANE k may include a plurality of blocks (refer to FIG. 4). Each of the plurality of blocks may include a plurality of sectors (not illustrated). The above-described logical units, planes, blocks, and sectors are only division units for classifying and managing memory areas, and division methods and names may vary according to memory design schemes.

When a read operation is performed on the plurality of sectors, that is, a read operation being performed in units of sectors, the above-described read command sequence may be referred to as a sector read command sequence. Accordingly, the first read command sequence may be referred to as a first sector read command sequence, and the second read command sequence may be referred to as a second sector read command sequence.

The controller 12 may generate the first sector read command sequence for one of a plurality of sectors of the first logical unit and the second sector read command sequence for one of a plurality of sectors of the second logical unit in response to the external command CMDe and may sequentially output the first and second sector read command sequences to the memory device 11.

The controller 12 may generate a first address recovery sequence for recovering a row address included in the first sector read command sequence and may output the first address recovery sequence to the memory device 11 after outputting the second sector read command sequence. The controller 12 may output the second sector read command sequence and the first address recovery sequence to the memory device 11 within the period of time determined by the timing parameter tWHR2.

The controller 12 may generate a second address recovery sequence for recovering a row address included in the second sector read command sequence and may output the second address recovery sequence to the memory device 11 after outputting data output according to the first sector read command sequence.

The controller 12 may allow the row addresses and column addresses to be included in the first sector read command sequence and the second sector read command sequence and may output the row addresses to the memory device 11 at an earlier timing compared to the column addresses.

Figure 4:
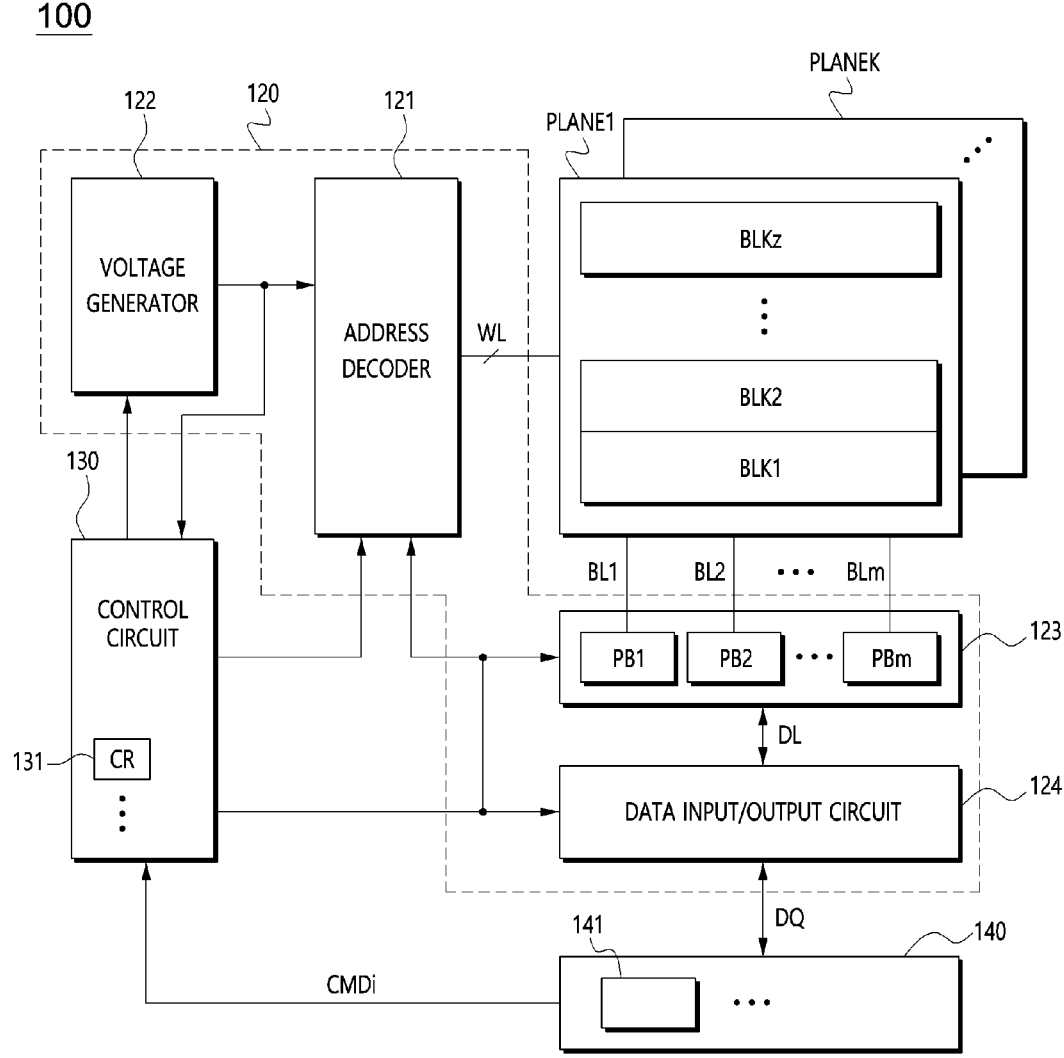
FIG. 4 is a diagram illustrating a configuration of a memory die, according to an embodiment of the present technology.

FIG. 4 is a diagram illustrating a configuration of a memory die 100, according to an embodiment of the present technology.

Referring to FIG. 4, the memory die 100 may include a plurality of planes PLANE 1 to PLANE K, a peripheral circuit 120, a control circuit 130, and an input/output pad unit 140. The peripheral circuit 120 may include an address decoder 121, a voltage generator 122, a read and write circuit 123, and a data input/output circuit 124. The read and write circuit 123 may include a plurality of page buffers PB1 to PBm.

The address decoder 121 and the plurality of page buffers PB1 to PBm may be connected to each of the plurality of planes PLANE 1 to PLANE K. That is, independent address decoder and page buffers may be used for each of the plurality of planes PLANE 1 to PLANE K. The plurality of planes PLANE 1 to PLANE K may share the control circuit 130, the data input/output circuit 124, and the input/output pad unit 140.

The input/output pad unit 140 may include a plurality of pads 141 for receiving a command sequence CMDi, an address, a clock signal, and inputting/outputting data DQ.

Each of the plurality of planes PLANE 1 to PLANE K may include a memory cell array, be connected to the address decoder 121 through word lines WL, and be connected to the read and write circuit 123 through bit lines BL1 to BLm. Each of the plurality of planes PLANE 1 to PLANE K may include a plurality of memory blocks BLK1 to BLKz. The plurality of memory blocks BLK1 to BLKz may be connected to the address decoder 121 through the word lines WL. The plurality of memory blocks BLK1 to BLKz may be connected to the read and write circuit 123 through the bit lines BL1 to BLm. Each of the plurality of memory blocks BLK1 to BLKz may include a plurality of memory cells. The plurality of memory cells may be non-volatile memory cells. The plurality of memory blocks BLK1 to BLKz may include a plurality of pages. Among the plurality of memory cells, memory cells connected to the same word line may be defined as one page. Normal data, that is, data transmitted and received through a normal read operation and a normal write operation may be stored in the plurality of memory blocks BLK1 to BLKz.

The memory cells of the memory die 100 may include single-level cells (SLC) each storing one-bit data, multi-level cells (MLC) each storing two-bit data, triple-level cells (TLC) each storing three-bit data, or quad-level cells (QLC) each storing four-bit data.

The peripheral circuit 120 may drive the plurality of planes PLANE 1 to PLANE K to perform a program operation, a read operation, and an erase operation.

The address decoder 121 may be connected to the plane PLANE 1 through the word lines WL. The address decoder 121 may be configured to operate in response to control of the control circuit 130. The address decoder 121 may receive addresses from the control circuit 130.

The address decoder 121 may select at least one memory block from among the memory blocks BLK1 to BLKz according to a decoded address. The address decoder 121 may be configured to decode a row address of the received addresses. The address decoder 121 may apply voltages received from the voltage generator 122 to at least one word line WL according to the decoded row address and may select at least one word line of the selected memory block.

The address decoder 121 may perform the program operation by applying a program voltage to the selected word line and applying a pass voltage having a lower level than the program voltage to unselected word lines.

The address decoder 121 may perform the read operation by applying a read voltage to the selected word line and applying the pass voltage having a higher level than the read voltage to the unselected word lines.

The erase operation of the memory die 100 may be performed in units of memory blocks. The address decoder 121 may perform the erase operation by applying a ground voltage to a word line coupled to the selected memory block and applying an erase voltage to a bulk region in which the selected memory block is formed.

The voltage generator 122 may generate various voltages required for the operation of the memory die 100, for example, the read voltage, the pass voltage, the program voltage, and the erase voltage, under the control of the control circuit 130 and may output the voltages to the address decoder 121.

The plurality of page buffers PB1 to PBm may be connected to the plane PLANE 1 through the first to $m^{th}$ bit lines BL1 to BLm, respectively. The plurality of page buffers PB1 to PBm may operate in response to control signals received from the control circuit 130.

The plurality of page buffers PB1 to PBm may perform data communication with the data input/output circuit 124. The plurality of page buffers PB1 to PBm may perform the program operation by receiving data, which are to be stored, through the data input/output circuit 124 and data lines DL and transferring the data to the plane PLANE 1. The read and write circuit 123 may perform the read operation by reading data from memory cells of a selected page through the bit lines BL and outputting the read data to the data input/output circuit 124. The read and write circuit 123 may perform the erase operation by allowing the bit lines BL to float.

The data input/output circuit 124 may be connected between the plurality of page buffers PB1 to PBm and the input/output pad unit 140. The data input/output circuit 124 may perform data input and output operations in response to the control signals received from the control circuit 130. The data input/output circuit 124 may output the data, which are transferred from the plurality of memory blocks BLK1 to BLKz through the plurality of page buffers PB1 to PBm during the read operation, to the controller 12 through the input/output pad unit 140. The data input/output circuit 124 may transfer the data, which are input from the controller 12 through the input/output pad unit 140 during the write operation, to the plurality of page buffers PB1 to PBm. The data input/output circuit 124 may output state information, which are transferred from the control circuit 130 during a state information read operation, to a device external to the memory die 100 through the input/output pad unit 140.

The control circuit 130 may be connected to the address decoder 121, the voltage generator 122, the read and write circuit 123, the data input/output circuit 124, and the input/output pad unit 140. The control circuit 130 may receive the command sequence CMDi, the addresses, and the clock signal through the input/output pad unit 140.

The control circuit 130 may include a plurality of column registers (CR) 131. As the plurality of column registers 131 are activated, the column addresses may be loaded and counted. The plurality of column registers 131 may correspond to the plurality of planes PLANE 1 to PLANE K, respectively. One column register 131 may be allocated to each of the plurality of planes PLANE 1 to PLANE K. The control circuit 130 may selectively activate the plurality of column registers 131 according to the row addresses, among the addresses transmitted through the input/output pad unit 140. The control circuit 130 may activate only column registers corresponding to planes corresponding to the row addresses, among the plurality of column registers 131.

FIG. 5 is a diagram illustrating an operating method of the data storage device 10, according to an embodiment of the present technology.

As the external read command CMDe is input, the controller 12 generates a first sector read command sequence SDO0 for the first logical unit LU0 and a second sector read command sequence SDO1 for the second logical LU1, among the plurality of logical units LU0 to LUn.

The first sector read command sequence SDO0 may include a command identification signal B6$h$, a row address RA, a column address CA, and a command identification signal E0$h$. The row address RA may have a value corresponding to the first logical unit LU0.

When the controller 12 generates the first sector read command sequence SDO0 and the second sector read command sequence SDO1, the row address RA may be output to the memory device 11 at an earlier timing compared to the column address CA.

For example, when the column address CA is output to the memory device 11 at an earlier timing compared to the row address RA, all of the column registers 131 of FIG. 3 perform a column address loading operation, which may result in a collision of column address information based on all planes other than a plane selected by the row address RA, causing an output data error.

Accordingly, in the present embodiment, as the row address RA is output to the memory device 11 at an earlier timing compared to the column address CA, only the column register 131 corresponding to a desired plane may be activated so that address loading and counting operations may be performed.

The second sector read command sequence SDO1 may include a command identification signal B6$h$, a row address RA, a column address CA, and a command identification signal E0$h$. The row address RA may have a value corresponding to the second logical unit LU1.

The controller 12 may transmit the first sector read command sequence SDO0 to the memory device 11 and may continuously transmit the second sector read command sequence SDO1 to the memory device 11 within the period of time determined by the timing parameter tWHR2.

As the second sector read command sequence SDO1 is transmitted to the memory device 11, a target address, that is, the row address RA included in the first sector read command sequence SDO0, may be changed to the row address RA included in the second sector read command sequence SDO1.

The controller 12 may generate a first address recovery sequence SDOR0 for recovering the row address RA included in the first sector read command sequence SDO0 and may transmit the first address recovery sequence SDOR0 to the memory device 11 within the period of time determined by the timing parameter tWHR2.

The first address recovery sequence SDOR0 may include a command identification signal B7h, a row address RA, and a command identification signal 00h. The row address RA included in the first address recovery sequence SDOR0 may have the same value as the row address RA included in the first sector read command sequence SDO0. Because the first address recovery sequence SDOR0 is a sequence for recovering the row address RA according to the first sector read command sequence SDO0, the first address recovery sequence SDOR0 might not need to include a column address CA.

After the first address recovery sequence SDOR0 is transmitted and the period of time determined by the timing parameter tWHR2 elapses, data may be output from a corresponding sector of the first logical unit LU0 corresponding to the row address RA of the first address recovery sequence SDOR0.

As the first address recovery sequence SDOR0 is transmitted, a target address, that is, the row address RA included in the second sector read command sequence SDO1, may be changed to the row address RA included in the first address recovery sequence SDOR0.

The controller 12 may generate a second address recovery sequence SDOR1 for recovering the row address RA included in the second sector read command sequence SDO1 and may transmit the second address recovery sequence SDOR1 to the memory device 11 after the data is output from the corresponding sector of the first logical unit LU0.

The second address recovery sequence SDOR1 may be transmitted, and data may be output from a corresponding sector of the second logical unit LU1 corresponding to the row address RA of the second address recovery sequence SDOR1.

A person skilled in the art to which the present technology pertains can understand that the present technology may be carried out in other specific forms without changing its technical spirit or essential features. Therefore, it should be understood that the embodiments described above are illustrative in all aspects, not limitative. The scope of the present technology is defined by the claims to be described below rather than the detailed description, and it should be construed that the meaning and scope of the claims and all changes or modified forms derived from the equivalent concept thereof are included in the scope of the present technology.

What is claimed is:

1. A data storage device comprising:
   a memory device divided into a plurality of logical units; and
   a controller configured to generate a first read command sequence and a second read command sequence for a first logical unit and a second logical unit, respectively, among the plurality of logical units, in response to an external command and configured to continuously output the first and second read command sequences to the memory device,
   wherein the controller is configured to generate a first address recovery sequence for recovering a row address included in the first read command sequence and configured to output the first address recovery sequence to the memory device after outputting the second read command sequence.

2. The data storage device according to claim 1,
   wherein the controller is configured to output the second read command sequence to the memory device within a period of time determined by a timing parameter according to the first read command sequence.

3. The data storage device according to claim 1,
   wherein the controller is configured to output the second read command sequence and the first address recovery sequence to the memory device within a period of time determined by a timing parameter according to the first read command sequence.

4. The data storage device according to claim 1,
   wherein the controller is configured to generate a second address recovery sequence for recovering a row address included in the second read command sequence and configured to output the second address recovery sequence to the memory device after outputting data output according to the first read command sequence.

5. The data storage device according to claim 1,
   wherein the controller is configured to include a row address and a column address in the first read command sequence and configured to output the row address to the memory device at an earlier timing compared to the column address.

6. A data storage device comprising:
   a memory device including a plurality of logical units, each including a plurality of planes,
   wherein each of the plurality of planes includes
     a plurality of sectors; and
     a controller configured to generate a first sector read command sequence for one of a plurality of sectors of a first logical unit and a second sector read command sequence for one of a plurality of sectors of a second logical unit, among the plurality of logical units, in response to an external command and configured to continuously output the first and second sector read command sequences to the memory device,
   wherein the controller is configured to generate a first address recovery sequence for recovering a row address included in the first sector read command sequence and configured to output the first address recovery sequence to the memory device after outputting the second sector read command sequence.

7. The data storage device according to claim 6,
   wherein the controller is configured to output the second sector read command sequence to the memory device within a period of time determined by a timing parameter according to the first sector read command sequence.

8. The data storage device according to claim 6,
   wherein the controller is configured to output the second sector read command sequence and the first address recovery sequence to the memory device within a period of time determined by a timing parameter according to the first sector read command sequence.

9. The data storage device according to claim 6, wherein the controller is configured to generate a second address recovery sequence for recovering a row address included in the second sector read command sequence and configured to output the second address recovery sequence to the memory device after outputting data output according to the first sector read command sequence.

10. The data storage device according to claim 6, wherein the controller is configured to include a row address and a column address in the first sector read command sequence and output the row address to the memory device with at an earlier timing compared to the column address.

11. The data storage device according to claim 10, wherein the memory device is configured to include a plurality of column registers corresponding to the plurality of planes, respectively, and is configured to activate only a column register corresponding to the row address, among the plurality of column registers.

12. An operating method of a data storage device including a memory device including a plurality of logical units, each including a plurality of planes, each of the plurality of planes including a plurality of sectors, and a controller connected to the memory device, the operating method comprising:

generating, by the controller, a first read command sequence for a first logical unit and a second read command sequence for a second logical unit, among the plurality of logical units, in response to an external read command received from a host;

outputting, by the controller, the first read command sequence to the memory device and continuously outputting, by the controller, the second read command sequence to the memory device within a period of time determined by a timing parameter according to the first read command sequence, and generating, by the controller, a first address recovery sequence for recovering a row address included in the first read command sequence and outputting, by the controller, the first address recovery sequence to the memory device after outputting the second read command sequence.

13. The operating method according to claim 12, wherein the controller outputs the second read command sequence and the first address recovery sequence to the memory device within the period of time determined by the timing parameter according to the first read command sequence.

14. The operating method according to claim 12, wherein the controller generates a second address recovery sequence for recovering a row address included in the second read command sequence and outputs the second address recovery sequence to the memory device after outputting data output according to the first read command sequence.

15. The operating method according to claim 12, wherein the controller outputs the first read command sequence to the memory device so that a row address included in the first read command sequence is transmitted to the memory device at an earlier timing compared to a column address included in the first read command sequence.

* * * * *